United States Patent [19]

Michna

[11] Patent Number: 4,959,127
[45] Date of Patent: Sep. 25, 1990

[54] SYSTEM FOR DESALINIZATION OF SALTWATER

[76] Inventor: Claus G. Michna, 4 Toby La., Brookfield Center, Conn. 06805

[21] Appl. No.: 64,400

[22] Filed: Jun. 22, 1987

Related U.S. Application Data

[63] Continuation-in-part of Ser. No. 904,542, Sep. 8, 1986, abandoned.

[51] Int. Cl.$^5$ .............................................. C02F 1/14
[52] U.S. Cl. ................................ 202/177; 159/48.1; 159/904; 202/181; 202/185.1; 202/234; 202/236; 202/266; 203/10; 203/90; 203/DIG. 1; 203/DIG. 17
[58] Field of Search ............... 202/181, 266, 177, 234, 202/185.1, 236, 190; 203/10, DIG. 1, 90, 22, DIG. 8, DIG. 17; 159/48.1, 46, 904; 126/418

[56] References Cited

U.S. PATENT DOCUMENTS

| | | | |
|---|---|---|---|
| 534,412 | 2/1895 | Vinton | 203/DIG. 17 |
| 2,402,737 | 6/1946 | Delano | 159/903 |
| 2,455,835 | 12/1948 | Ushakoff | 202/234 |
| 3,168,450 | 2/1965 | Black | 203/DIG. 1 |
| 3,173,269 | 3/1965 | Imbertson | 405/115 |
| 3,224,948 | 12/1965 | Akers | 159/903 |
| 3,357,897 | 12/1967 | Salzer | 202/234 |
| 3,415,719 | 12/1968 | Telkes | 159/904 |
| 4,135,985 | 1/1979 | La Rocca | 203/DIG. 1 |
| 4,151,830 | 5/1979 | Crombie et al. | 203/DIG. 1 |
| 4,325,788 | 4/1982 | Snyder | 203/10 |
| 4,504,362 | 3/1985 | Kruse | 203/DIG. 1 |
| 4,620,820 | 11/1986 | Collipp | 405/224 |

FOREIGN PATENT DOCUMENTS

| | | | |
|---|---|---|---|
| 0007636 | 2/1980 | European Pat. Off. | 405/115 |
| 2452302 | 11/1980 | France | 202/234 |
| 0006273 | 1/1978 | Japan | 203/DIG. 1 |
| 0649778 | 5/1979 | U.S.S.R. | 405/115 |
| 0012402 | of 1889 | United Kingdom | 159/903 |
| 0832123 | 4/1960 | United Kingdom | 159/904 |
| 1166840 | 10/1969 | United Kingdom | 203/DIG. 1 |
| 1599809 | 10/1981 | United Kingdom | 202/254 |

Primary Examiner—Virginia Manoharan
Attorney, Agent, or Firm—Vincent A. Mallare

[57] ABSTRACT

A system for desalinating saltwater. The system includes a platform container and a plastic dome covering through which solar ray heat passes to distill the saltwater fed therein and thereby separate therefrom distilled fresh water.

4 Claims, 6 Drawing Sheets

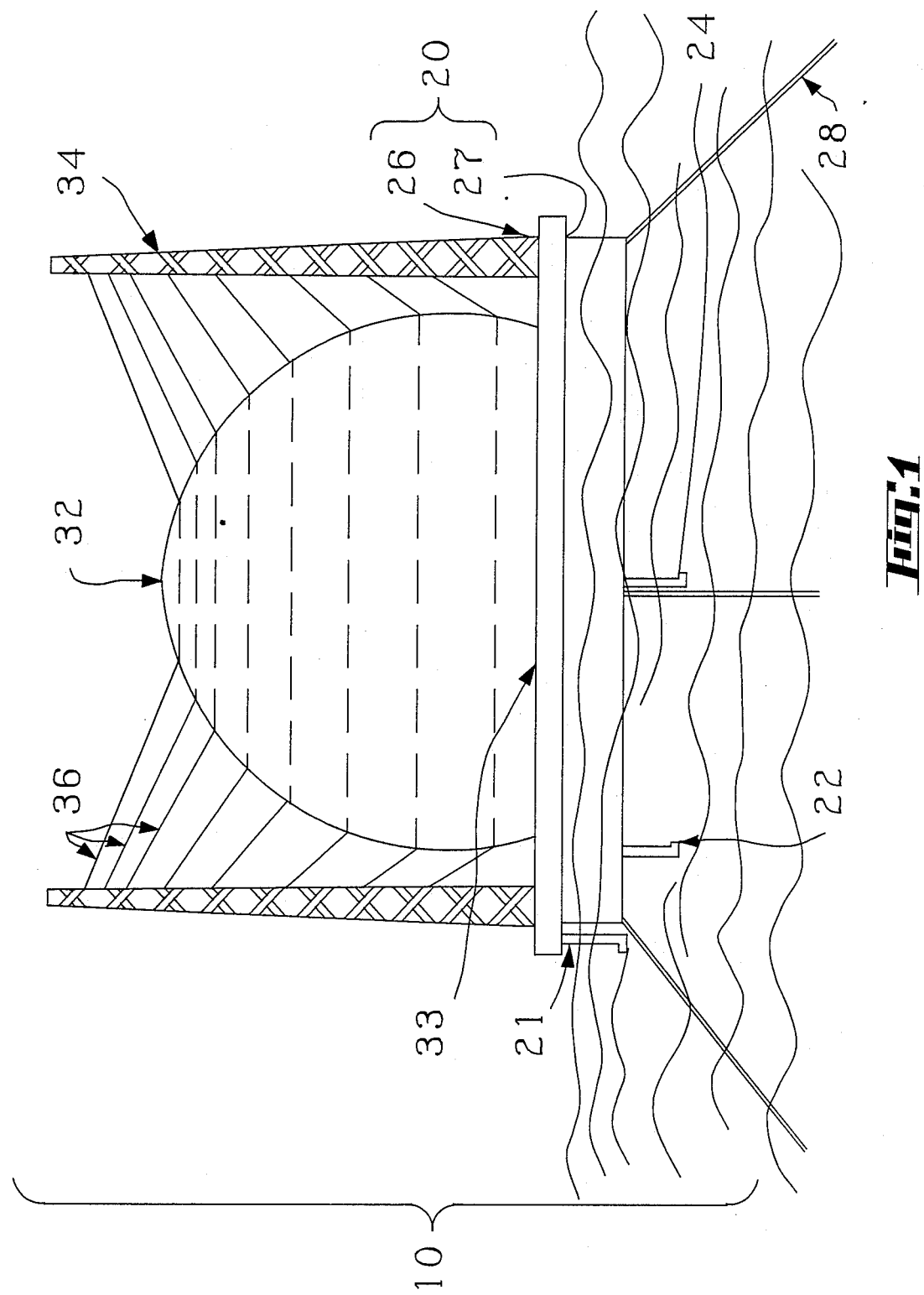

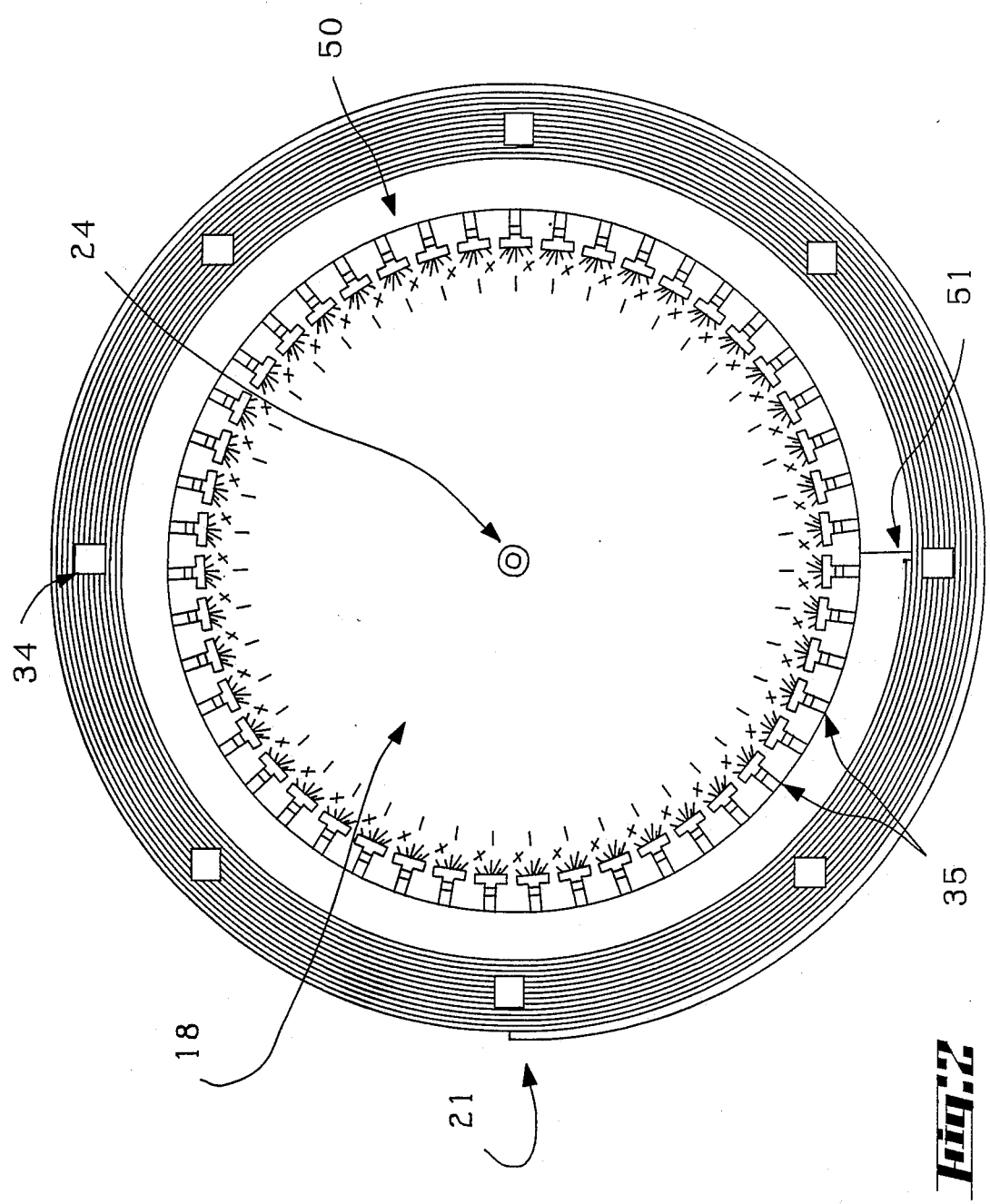

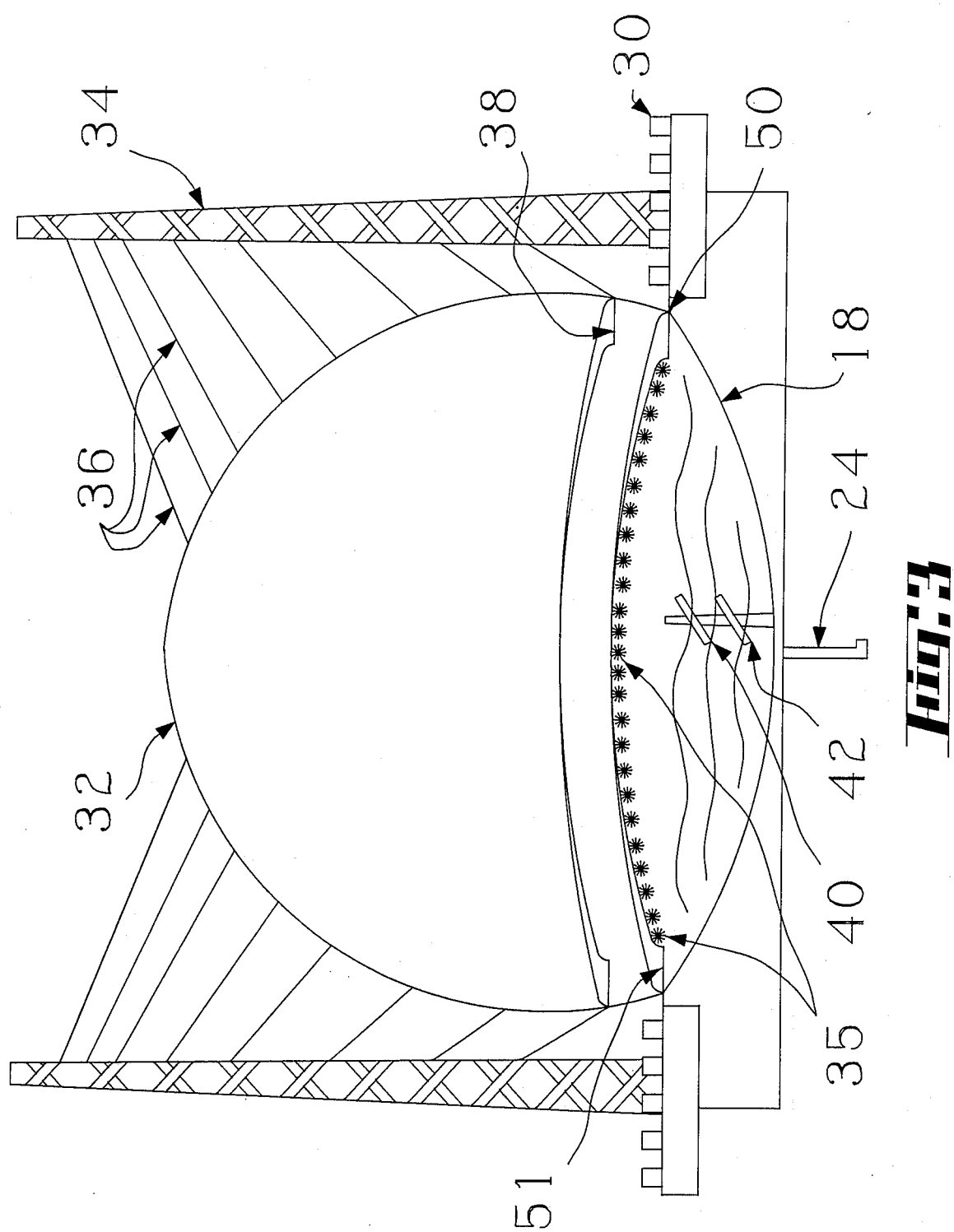

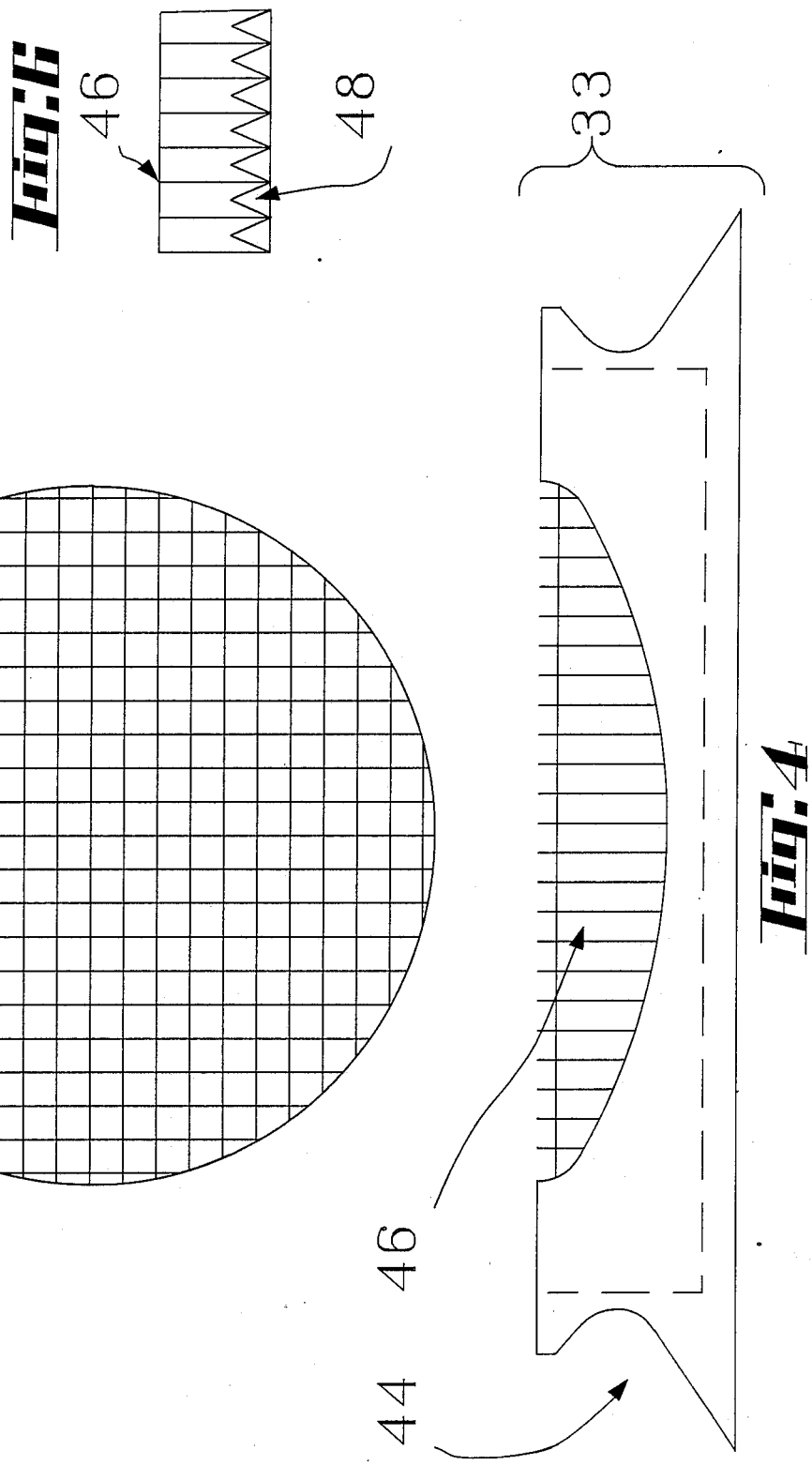

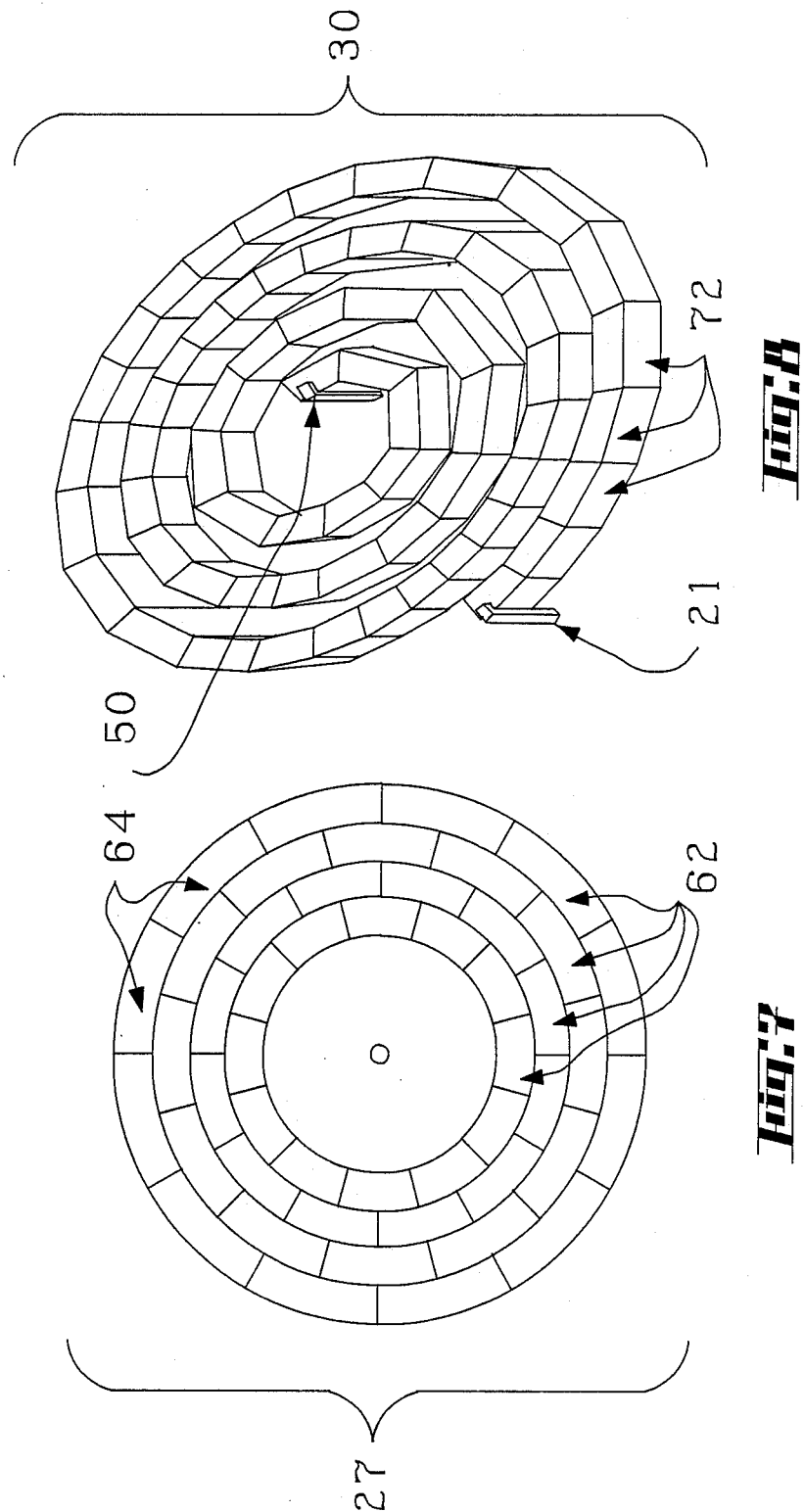

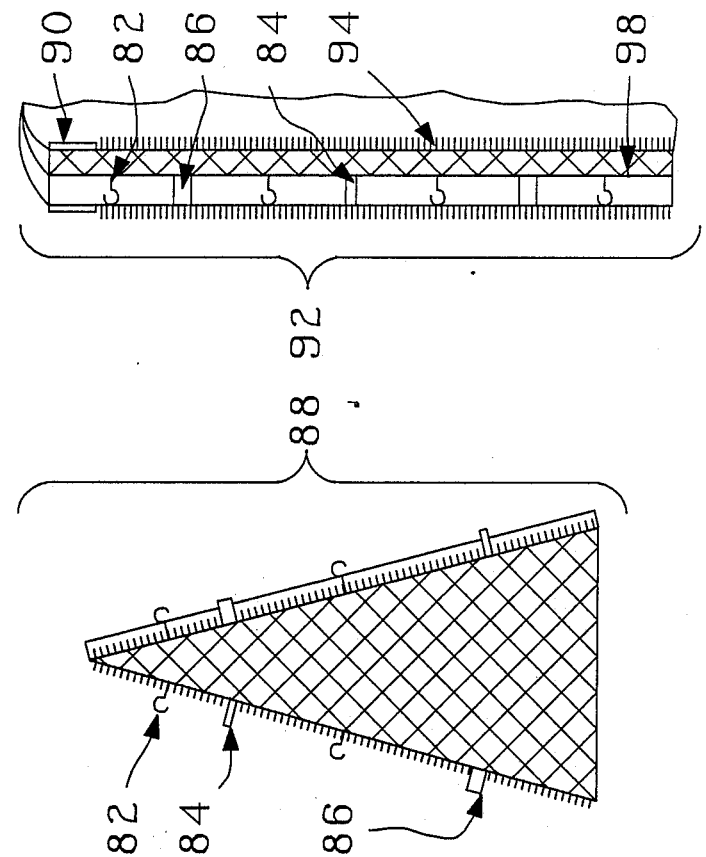
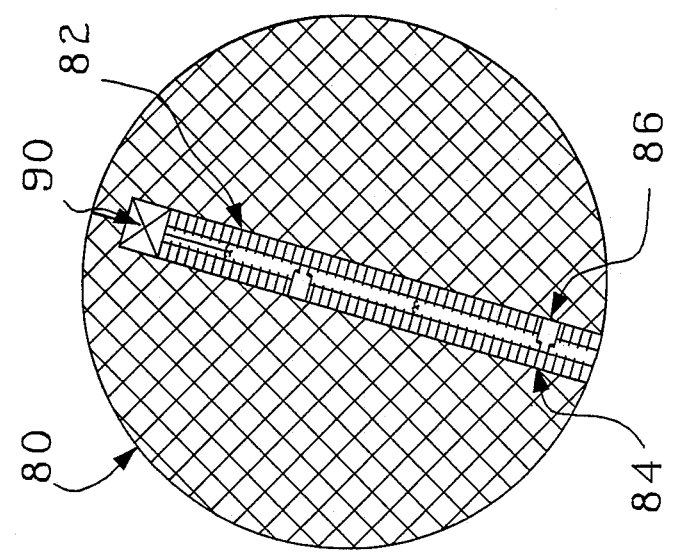

SYSTEM FOR DESALINIZATION OF SALTWATER

CROSS REFERENCE TO RELATED PATENTS/APPLICATIONS

This application is a continuation-in-part of U.S. application, Ser. No. 904,542 filed Sept. 8, 1986, now abandoned.

BACKGROUND OF THE INVENTION

This invention relates to the desalting of seawater and, more particularly, to an apparatus for the desalinization of saltwater.

The supply of a sufficient amount of good fresh water for cooking, drinking and bathing has long been a concern, particularly in areas where there are water problems. The oceans or saltwater lakes are areas where there is a large amount water available but which water is not usable because of the salt and other impurities contained therein.

There have been many attempts to provide a means of obtaining fresh water from saltwater, however, these means have either been very complex mechanisms and/or very expensive.

Thus, it is the primary object of this invention to provide an apparatus that desalinates saltwater simply and economically as well as providing therefrom distilled fresh water.

DISCLOSURE STATEMENT

U.S. Pat. No. 3,224,948 discloses an apparatus for distilling non-potable water to produce potable water.

U.S. Pat. No. 3,357,897 discloses a water purification apparatus having an elongated casing closed at the bottom. This apparatus is a solar type of still for double distillation.

U.S. Pat. No. 4,151,830 discloses an inflatable collector for solar energy which is provided with superposed layers of plastic sheet materials.

U.S. Pat. No. 4,504,362 discloses a solar desalinization system in which fresh water is derived from sea water.

British Patent No. 1,599,809 discloses a water distillation plant comprises of a flexible sheet or envelope ducted to a condenser.

SUMMARY OF THE INVENTION

The present invention provides a system for desalinating saltwater. The system comprises:
 (a) an anchored platform container having a saltwater input valve and a fresh water output valve;
 (b) a preheating coil surrounding the platform for preheating saltwater before it enters the platform container;
 (c) a supported, collapsible plastic dome covering the opening of the platform container, whereby solar ray heat entering within the dome is maintained to raise the temperature therein sufficiently higher than the temperature outside the dome to vaporize the saltwater and condense therefrom fresh water.

The system may be further supported against ocean waves by an outer skirt which can be placed around the platform container and the water within the container can be stabilized with a honeycomb wavebreaker section placed in the platform container in order to prevent the container from capsizing in high seas.

DETAILED DESCRIPTION OF THE INVENTION

In providing fresh water for cooking, drinking and bathing from impure and/or saltwater, a system is provided by the present invention to produce distilled fresh water.

The system utilizes solar ray heat to produce a distillation action which distills fresh water from the saltwater that is separated therefrom to produce distilled, salt-free fresh water.

This system may be used offshore, in an ocean or saltwater lake, or onshore or in a desert where saltwater is pumped to the system and distilled fresh water is pumped therefrom for use in cooking, drinking and bathing.

When the system is used offshore, the anchored platform container is referred to as a container; when the system is used onshore, the anchored platform container is referred to as a vessel.

The present invention will be more clearly understood when discussed and considered in conjunction with the drawings (figures, i.e., FIGS.) described below.

BRIEF DESCRIPTION OF DRAWINGS

FIG. 1 is an elevational (side) view of the system of the present invention;

FIG. 2 is a top view of the system of FIG. 1;

FIG. 3 is a partial elevational view of the system of FIG. 1;

FIG. 4 is a side view of the outer support skirt of the platform of the system of FIG. 1;

FIGS. 5 and 6 are top and side views, respectively, of the honeycomb wavebreaker section placed in the platform container of FIG. 1;

FIG. 7 is a top view of the platform of the present system showing the center piece and sections thereof;

FIG. 8 is the preheating coil of the present system showing sections making up the coil;

FIG. 9A is a sectional view of the skin of the dome, illustrating the joining of contiguous dome sections;

FIG. 9B is a triangular section making up the skin of the dome; and

FIG. 9C is a partial/cross-sectional view of the skin layers fused to a wire mesh sandwiched between the skin layers.

In FIG. 1, the desalinization system (10) is shown, which is constructed of a platform container/vessel (20) which has a saltwater input valve (21) for admission of saltwater into the container/vessel (20) and a fresh water output valve (22) which has a pipeline (not shown) extending to shore or a storage vessel/container for distilled fresh water produced by the present system (10). In the distilling action created at sufficiently high temperatures in the dome (32), there is heavy saltwater from which fresh water was separated. This heavy saltwater is removed from the platform container/vessel (20) through exit valve (24).

The platform container/vessel (20) into which the saltwater is fed through valve (21) has a top portion (26) and a body portion (27) and is anchored by cables (28) having anchors (not shown) attached at their ends.

Referring to FIG. 3, there is an enlarged partial view of the platform (20), dome (32) and supporting columns (34). Also, a gutter (38) surrounding the inner edge of the dome (32) is provided to collect the fresh water distilled from the saltwater fed into the system (10).

Also, as indicated in FIGS. 2 and 3, the system (10) has a pan (18) positioned within the opening (33). The pan is filled with saltwater where the freshwater has evaporated from the saltwater leaving a layer of salt on the walls of the pan (18). There is a second gutter (51) for saltwater which is connected to the intake pipe (50) and the preheating coil (30).

Attached to the gutter (51) are spray nozzles (35) which have the function to spray clean the walls of the pan (18) from salt deposits, while at the same time filling the pan (18) with a new supply of saltwater.

As shown in both FIGS. 2 and 3, there is a preheating coil (30) placed around the platform (20) to preheat the saltwater before it is fed into the platform. The saltwater is further heated by solar ray heat which is transmitted through a plastic dome (32), as illustrated in FIGS. 1 and 2.

The dome (32), as shown in FIG. 1, is arranged so that it covers the opening (33) in the platform container/vessel (20). The dome is supported by support columns (34) which have cables (36) attached thereto. The support columns (34) can be rigid, i.e., welded or bolted to the platform, or pivoted, i.e., arranged to be placed horizontally on the surface of the platform (20). The cables are extendable and arranged so the dome can be collapsed if there is a need in bad weather or high winds.

The dome (32), as illustrated in FIG. 9C, is constructed from outer (94) and inner (96) layers of plastic skin, which plastic layers are fused to a wire mesh (98) sandwiched therebetween, whereby a single skin consisting of double plastic layers reinforced with a wire mesh is formed. This reinforced double plastic layer skin makes up the dome. The dome skin (32) is made up of skin section (88) as shown in FIG. 9B. The individual sections (88) of the dome skin are made up of double plastic layers of skin fused to a triangular wire mesh which is sandwiched therebetween. The skin sections (88) are contiguous triangular pieces which are connected to one another by connecting the wire mesh sections (88) by hooks (82) and male (84) and female (86) connectors to form the dome skin. As shown in FIGS. 9A and 9C, zippers are provided to seal the outer (94) and inner (96) plastic layers of dome skin (32).

The dome skin (32) in the present system is and in effect is the condenser of distilled fresh water. In the condensing operation, the portion of dome skin (32) opposite to that portion exposed to the solar ray is the actual condenser of the fresh water.

The present system does not require a clear plastic dome skin. Preferably, the dome skin is not clear and transparent. The system will function in the dark or at night so long as the temperature within the dome is sufficiently higher than that outside the dome to condense the fresh distilled water.

Referring specifically to FIG. 3, there is illustrated the manner in which the platform container/vessel (20) is filled to a predetermined level with saltwater. Initially, the saltwater is pumped through the intake line (21) and then into the preheating coils (30) until they are all filled. Then, the preheated saltwater is passed through an inlet valve (50) into the gutter (51) and through the spray nozzles (35) into the pan (18). When the saltwater level reaches the intake valve sensor (40), the flow of water is cut-off, i.e., stopped. After the saltwater is distilled to separate fresh distilled water, the level of water will drop down to the level of the saltwater exit cutoff valve sensor (42), which opens the intake valve (50) to release saltwater from the preheating coils (30) to the level of the intake cutoff valve sensor (40) and the distillation action resumes. The preheating coil (30) is always filled with saltwater except when there is the release of water caused by the opening action of the exit cutoff valve (40).

In FIG. 4, a further support of the platform (20) and system is provided in the means of an outer skirt (44) which as shown is arranged to surround the platform (20) to be used as an outer wavebreaker. The skirt (44) may be bolted or welded to the metal platform/container (20).

In FIGS. 5 and 6 there are, respectively, cross-sectional and side evaluation views of a honeycomb wavebreaker (46) which may be placed within the platform container/vessel (20). Usually, the wavebreaker (46) is placed in the platform (20) when the system (10) is used in a body of water, e.g., an ocean or saltwater lake, and not when the system (10) is used onshore, e.g., desert. Also, as shown in FIG. 6, there are openings (48) arranged in the bottom of the honeycomb wavebreaker (46) so that the saltwater will flow all through the wavebreaker (46), i.e., from side to side and thereby preventing the container from capsizing.

The manner in which the apparatus operates is by having water fed into the container/vessel (20) to a certain level which is maintained for uniform heating by solar heat through the plastic dome (32) to raise the temperature sufficiently high to cause a distillation action whereby the saltwater is distilled to separate therefrom distilled or fresh water. This fresh water is then drained out through an exit tube (22) into a pipeline which is directed to shore and/or to a storage container/vessel for use in cooking, washing, drinking and bathing.

According to the present invention, the dome skin (32) which consists of sections (80) may be made larger or smaller, respectively, by adding or removing skin sections (80). Likewise, the platform (20) which consists of outer ring sections (62) made up of segments (64) may be made larger or smaller, respectively, by adding or removing outer ring sections (62).

I claim:

1. A system for desalinating saltwater comprising:
an anchored platform container having an opening, a saltwater input valve and a fresh water output valve, wherein said platform container has a honeycomb wavebreaker therein to stabilize the level of the saltwater therein and thereby prevent the container from capsizing; a pan positioned in said opening including a first gutter, which surrounds said pan, spray nozzles attached thereto to both clean said pan and fill said pan with saltwater, and level sensor means for controlling the level of saltwater in said pan;
A preheating coil surrounding said platform container for preheating saltwater before it enters said platform container; and
a supported, collapsible plastic dome skin covering the opening of said platform container, said dome skin consists of skin sections of outer and inner plastic layers fused to a wire mesh sandwiched therebetween, whereby a single wire mesh reinforced skin is formed, and whereby solar ray heat is transmitted through the plastic dome and maintained within said dome to raise the temperature therein sufficiently higher than the temperature outside said dome to vaporize the saltwater and condense therefrom fresh water.

2. The system of claim 1, wherein the skin of said dome is the condenser of said fresh water.

3. The system of claim 2, wherein the portion of the dome skin opposite to that portion exposed to the solar rays is the condenser of said fresh water.

4. The system of claim 1, wherein said dome has a second gutter surrounding the inside of the dome to collect the fresh water separated from the saltwater.

* * * * *